(12) United States Patent
Iwata et al.

(10) Patent No.: US 10,703,032 B2
(45) Date of Patent: Jul. 7, 2020

(54) MANUFACTURING METHOD AND MANUFACTURING DEVICE FOR HOLLOW PART WITH BRANCHING PORTION

(71) Applicants: TOYODA IRON WORKS CO., LTD., Toyota-shi, Aichi (JP); RP TOPLA LIMITED, Suita-shi, Osaka (JP)

(72) Inventors: Kunihiro Iwata, Toyota (JP); Hideaki Sakai, Toyota (JP); Yasuhiro Sone, Toyota (JP); Takashi Hirose, Ota (JP); Kazuhiro Yokobori, Ota (JP)

(73) Assignees: TOYODA IRON WORKS CO., LTD., Toyota-shi (JP); RP TOPLA LIMITED, Suita-shi (JP)

( * ) Notice: Subject to any disclaimer, the term of this patent is extended or adjusted under 35 U.S.C. 154(b) by 595 days.

(21) Appl. No.: 15/127,266

(22) PCT Filed: Nov. 14, 2014

(86) PCT No.: PCT/JP2014/080180
§ 371 (c)(1),
(2) Date: Sep. 19, 2016

(87) PCT Pub. No.: WO2015/141056
PCT Pub. Date: Sep. 24, 2015

(65) Prior Publication Data
US 2017/0106575 A1    Apr. 20, 2017

(30) Foreign Application Priority Data
Mar. 18, 2014  (JP) ................................. 2014-055098

(51) Int. Cl.
*B29C 45/17*    (2006.01)
*B29C 45/33*    (2006.01)
(Continued)

(52) U.S. Cl.
CPC ...... *B29C 45/1705* (2013.01); *B29C 45/0055* (2013.01); *B29C 45/1704* (2013.01);
(Continued)

(58) Field of Classification Search
CPC ...... B29C 45/00; B29C 45/1704; B29C 43/22
See application file for complete search history.

(56) References Cited

U.S. PATENT DOCUMENTS 5,948,343 A * 9/1999 Hiroki ................. B29C 33/0033
264/319
2003/0104098 A1* 6/2003 Schrader ................. B29C 49/50
425/522
2006/0073289 A1* 4/2006 Bahnsen ................. B29C 49/50
428/34.1

FOREIGN PATENT DOCUMENTS

JP       08230066 A  *  9/1996  ............. B29C 45/00
JP    H08-230066 A       9/1996
(Continued)

OTHER PUBLICATIONS

May 10, 2017 Office Action issued in Chinese Patent Application No. 201480077213.2.
(Continued)

*Primary Examiner* — Jacob T Minskey
*Assistant Examiner* — Cedrick S Williams
(74) *Attorney, Agent, or Firm* — Oliff PLC

(57) ABSTRACT

A method for manufacturing a hollow part with a branch, including a resin filling step of filling a mold, the mold having a main cavity in which a hollowing piece is placed, and a branch cavity to communicate with the main cavity, in which a slide shaft is inserted to advance and withdraw, and that forms a branch pipe portion in an annular space between the branch cavity and the slide shaft, a step of forming a hollow main pipe portion by moving the hollowing piece to force excess resin out of the main cavity, and a shaft
(Continued)

removing step of withdrawing the slide shaft to form a branch hollow portion, the hollow part with a branch being made of a resin and having the branch pipe portion integrally connected to the main pipe portion such that the main hollow portion and the branch hollow portion communicate with each other.

4 Claims, 7 Drawing Sheets

(51) Int. Cl.
    *B29D 23/00*     (2006.01)
    *B29C 45/00*     (2006.01)
    *B29L 23/00*     (2006.01)
    *B29K 101/12*     (2006.01)
    *B29K 105/06*     (2006.01)

(52) U.S. Cl.
    CPC ............ *B29C 45/33* (2013.01); *B29D 23/001* (2013.01); *B29C 2045/0058* (2013.01); *B29C 2045/0087* (2013.01); *B29C 2045/1719* (2013.01); *B29C 2045/1724* (2013.01); *B29C 2045/1726* (2013.01); *B29K 2101/12* (2013.01); *B29K 2105/06* (2013.01); *B29L 2023/004* (2013.01)

(56)     References Cited

FOREIGN PATENT DOCUMENTS

| | | | |
|---|---|---|---|
| JP | 2006255868 A | * | 9/2006 |
| JP | 2010-076280 A | | 4/2010 |

OTHER PUBLICATIONS

Sep. 27, 2016 Office Action issued in Japanese Patent Application No. 2014-055098.

Dec. 9, 2014 Search Report issued in International Patent Application No. PCT/JP2014/080180.

* cited by examiner

MANUFACTURING METHOD AND MANUFACTURING DEVICE FOR HOLLOW PART WITH BRANCHING PORTION

TECHNICAL FIELD

The present invention relates to methods and apparatuses for manufacturing a hollow part with a branch which is made of a resin and in which a branch pipe portion is integrally connected to a main pipe portion such that a hollow portion of the branch pipe portion communicates with a hollow portion of the main pipe portion.

BACKGROUND ART

A method for manufacturing a hollow part with a branch is known which includes (a) a resin filling step of filling a mold with a molten resin, the mold having a main cavity that has a hollowing piece placed therein, and a branch cavity that is formed so as to communicate with the main cavity, that has a slide shaft inserted therein so that the slide shaft can advance and withdraw therein, and that forms a branch pipe portion in an annular space between the branch cavity and the slide shaft, (b) a main pipe portion forming step of forming a hollow main pipe portion by moving the hollowing piece to force excess resin out of the main cavity through an outlet port formed at one end of the main cavity and thus form a hollow portion in the resin in the main cavity, and (c) a shaft removing step of withdrawing the slide shaft located in the branch cavity to form a hollow portion in the branch pipe portion, (d) the hollow part with a branch being made of a resin and having the branch pipe portion integrally connected to the main pipe portion such that the hollow portions communicate with each other. A technique described in Patent Document 1 is one example of such a method. Patent Document 1 proposes that a communication hole is formed in a joint between the main pipe portion and the branch pipe portion by drilling with a drill, a cutter, etc. or by turning a holding bar, which is formed integrally with a resin wall in a portion where the communication hole is to be formed, so as to remove the resin wall in this portion.

RELATED ART DOCUMENTS

Patent Documents

Patent Document 1: Japanese Patent Application Publication No. 1108-230066

SUMMARY OF THE INVENTION

Problem to be Solved by the Invention

However, drilling with a drill, a cutter, etc. requires a larger number of steps, which reduces productivity and increases manufacturing cost. Turning the holding bar to remove the resin wall tends to form burrs and therefore requires complicated finishing such as filing. Accordingly, the latter method still has room for improvement.

The present invention was developed in view of the above circumstances, and it is an object of the present invention to make it possible to easily and inexpensively faint a communication hole in a joint between a main pipe portion and a branch pipe portion.

Solution to Problem

To achieve the above object, a first aspect of the invention provides a method for manufacturing a hollow part with a branch, including (a) a resin filling step of filling a mold with a molten resin, the mold having a main cavity in which a hollowing piece is placed, and a branch cavity that is formed so as to communicate with the main cavity, in which a slide shaft is inserted so as to advance and withdraw, and that forms a branch pipe portion in an annular space between the branch cavity and the slide shaft, (b) a main pipe portion forming step of forming a hollow main pipe portion by moving the hollowing piece to force excess resin out of the main cavity through an outlet port formed at one end of the main cavity and thus form a main hollow portion in the resin in the main cavity, and (c) a shaft removing step of withdrawing the slide shaft located in the branch cavity to form a branch hollow portion in the branch pipe portion, (d) the hollow part with a branch being made of a resin and having the branch pipe portion integrally connected to the main pipe portion such that the main hollow portion and the branch hollow portion communicate with each other, the method wherein (e) in the main pipe portion forming step, the hollowing piece is moved to the outlet port by injecting pressurized fluid into the main cavity through a pressurizing port formed at the other end of the main cavity that is an opposite end of the main cavity from the outlet port and the method characterized by comprising: (f) a punching step of, after forming the main pipe portion in the main pipe portion forming step, advancing the slide shaft toward the main cavity so that an entire outer peripheral edge of a tip end of the slide shaft projects into the main hollow portion of the main pipe portion and thus forming a communication hole through a portion of a resin wall of the main pipe portion, at which the branch pipe portion is connected; and (g) a punching scrap moving step of, subsequent to the punching step, injecting pressurized fluid through the pressurizing port to move punching scrap resulting from formation of the communication hole by the slide shaft toward the outlet port.

A second aspect of the invention provides the method recited in the first aspect of the invention, wherein (a) in the main pipe portion forming step, the hollowing piece is moved to the outlet port by injecting pressurized fluid into the main cavity through a pressurizing port formed at the other end of the main cavity that is an opposite end of the main cavity from the outlet port, the method further comprising: (b) a punching scrap moving step of, subsequent to the punching step, injecting pressurized fluid through the pressurizing port to move punching scrap resulting from formation of the communication hole by the slide shaft toward the outlet port.

A second aspect of the invention provides an apparatus for manufacturing a hollow part with a branch, including (a) a mold having a main cavity in which a hollowing piece is placed, and a branch cavity that is formed so as to communicate with the main cavity, in which a slide shaft is inserted so as to advance and withdraw, and that forms a branch pipe portion in an annular space between the branch cavity and the slide shaft, (b) a fluid injection apparatus that injects pressurized fluid into the main cavity through a pressurizing port formed at the other end of the main cavity that is an opposite end of the main cavity from an outlet port formed at one end of the main cavity, in order to form a hollow main pipe portion by moving the hollowing piece to force excess resin out of the main cavity through the outlet port and thus form a main hollow portion in the resin in the main cavity, and (c) a slide shaft moving apparatus that withdraws the slide shaft located in the branch cavity to form a branch hollow portion in the branch pipe portion, (d) the hollow part with a branch being made of a resin and having the branch pipe portion integrally connected to the main pipe portion such that the main hollow portion and the branch hollow portion communicate with each other, the apparatus characterized in that (e) the slide shaft moving apparatus advances and withdraws the slide shaft so that a communication hole is formed through a portion of a resin wall of the main pipe portion, at which the branch pipe portion is connected, by advancing the slide shaft toward the main cavity so that an entire outer peripheral edge of a tip end of the slide shaft projects into the main hollow portion of the main pipe portion, and (f) a tip end face of the slide shaft has a concave shape curved inward in a middle, and an outer peripheral edge of the tip end face has a plurality of protruding portions that protrude toward a tip end side and that are separated from each other in a circumferential direction.

A fourth aspect of the invention provides the apparatus recited in the third aspect of the invention, wherein a tip end face of the slide shaft has a concave shape curved inward in a middle, and an outer peripheral edge of the tip end face has a plurality of protruding portions that protrude toward a tip end side and that are separated from each other in a circumferential direction.

Advantageous Effects of the Invention

In the method for manufacturing the hollow part with a branch according to the first aspect of the invention, the slide shaft is advanced toward the main cavity so that the entirety of the outer peripheral edge of the tip end of the slide shaft projects into the main hollow portion of the main pipe portion to form the communication hole. Accordingly, the communication hole can be formed in a series of manufacturing steps in a simple and easy way. Moreover, since the shape of the tip end of the slide shaft is suitably defined, formation of burrs can be restrained, and the need for finishing such as filing is eliminated or reduced. This improves productivity and reduces manufacturing cost.

The second aspect of the invention relates to the case where the main pipe portion is formed by injecting the pressurized fluid through the pressurizing port formed in the main cavity to move the hollowing piece to the outlet port. Subsequent to the punching step, pressurized fluid is injected through the pressurizing port again so that the punching scrap resulting from formation of the communication hole is moved toward the outlet port. Accordingly, the excess resin, which is forced through the outlet port at the main pipe portion forming step, together with the punching scrap can be collected and recycled, for example, which facilitates post-processing of the punching scrap.

The apparatus for manufacturing a hollow part with a branch according to the third aspect of the invention can perform the manufacturing methods of the first aspect of the invention and the second aspect of the invention in a preferable manner, and has substantially similar functions and effects to those of the first aspect of the invention and the second aspect of the invention. In the fourth aspect of the invention, the tip end face of the slide shaft has a concave shape curved inward in the middle, and the outer peripheral edge of the tip end face has the plurality of protruding portions that protrude toward the tip end side and that are separated from each other in the circumferential direction. Accordingly, when the outer peripheral edge punches the resin wall to form the communication hole, the protruding portions can serve as a starting point for the outer peripheral edge to appropriately cut into and through the resin wall. This further restrains formation of burrs.

MODES FOR CARRYING OUT THE INVENTION

Figure 1:
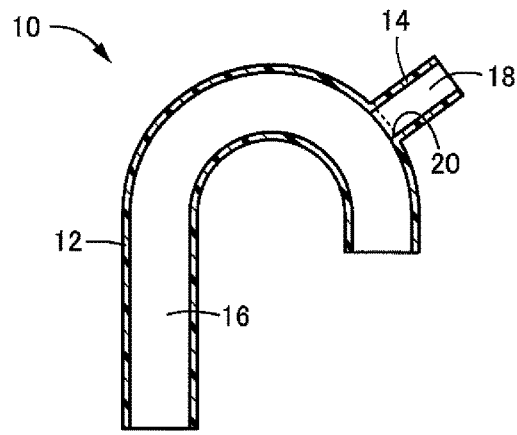
FIG. 1 is a sectional view of a hollow part with a branch which can be manufactured according to a method of the present invention.

In the present invention, the communication hole is formed by advancing the slide shaft. This restrains formation of burrs and eliminates the need for finishing such as filing depending on conditions of a resin material etc. However, finishing such as filing may be performed as necessary, and even in this case, the finishing work is easy. Regarding the shape of the tip end of the slide shaft, it is desirable that the tip end face of the slide shaft have a concave shape curved inward in the middle, and the outer peripheral edge of the tip end face have the plurality of protruding portions that protrude toward the tip end side and that are separated from each other in the circumferential direction. However, the tip end face of the slide shaft may be in various forms such as a flat tip end face perpendicular to the axis of the slide shaft and a tip end face having a curved shape corresponding to the resin wall of the main pipe portion. The slide shaft may be rotated about the axis in addition to being advanced.

The main pipe portion and the branch pipe portion typically have a cylindrical shape with a circular section. However, the main pipe portion and the branch pipe portion may be in various forms, that is, may have an elliptical section or a quadrilateral section. The longitudinal shape of the main pipe portion may be a linear shape or a curved shape such as a bent shape and may be determined as appropriate. Since the hollow portion of the branch pipe portion is formed by advancing and withdrawing the slide shaft in an axial direction thereof, at least this hollow portion has a linear shape. A plurality of the branch pipe portions may be connected to the main pipe portion, and the angle at which the branch pipe portions are connected to the main pipe portion is determined as appropriate.

The hollowing piece that forms the main hollow portion of the main pipe portion is a floating hollowing piece that is moved by the pressurized fluid. The floating hollowing piece can appropriately form the main hollow portion even if the main pipe portion has a complex shape such as a bent shape, a U-shape, or a J-shape. Various kinds of fluid such as nitrogen gas, air, and glycerin may be used as the pressurized fluid. However, inert gas such as nitrogen gas is desirable.

It is desirable that an opening/closing member that opens and closes the outlet port of the main cavity as necessary be disposed at the outlet port and a waste cavity that receives the excess resin is formed continuously with the outlet port. The opening/closing member and the waste cavity may be omitted. For example, an outlet port having a relatively small opening section so that outflow of the molten resin can be limited may only be formed. The mold can be separated into a plurality of parts so that a molded article can be taken out of the mold.

The slide shaft moving apparatus that advances and withdraws the slide shaft can stop the slide shaft at least at three positions, namely an advanced position where the tip end of the slide shaft projects into the main hollow portion of the main pipe portion, a withdrawn position where the tip end of the slide shaft is located outside the branch cavity, and a forming position where the tip end of the slide shaft is located near the main cavity so that the branch pipe portion is formed in the resin filling step. Specifically, the slide shaft moving apparatus may be in various forms, that is, may be formed by a pair of reciprocating cylinders or formed by a lead screw mechanism etc. that rotates a lead screw by an electric motor to linearly reciprocate the slide shaft.

EMBODIMENTS

Embodiments of the present invention will be described in detail with reference to the accompanying drawings.

FIG. 1 is a sectional view of a hollow part 10 with a branch manufactured according to a method of the present invention. The hollow part 10 with a branch has an inverted J-shaped main pipe portion 12 and a linear branch pipe portion 14 connected to an intermediate position of the main pipe portion 12. The hollow part 10 is formed as a single-piece member from a synthetic resin material such as a fiber reinforced thermoplastic resin or an unreinforced thermoplastic resin. The main pipe portion 12 and the branch pipe portion 14 have a cylindrical shape with a circular section, and have a main hollow portion 16 and a branch hollow portion 18 inside. The main pipe portion 12 and the branch pipe portion 14 are open at their both ends in the longitudinal direction, and the main hollow portion 16 and the branch hollow portion 18 communicate with each other via a communication hole 20 formed in a resin wall of the main pipe portion 12. The branch pipe portion 14 is connected to the main pipe portion 12 substantially at right angles. The diameter dimension of the branch pipe portion 14 is smaller than that of the main pipe portion 12, and the communication hole 20 has the same diameter dimension as the branch hollow portion 18 of the branch pipe portion 14.

Figure 2:
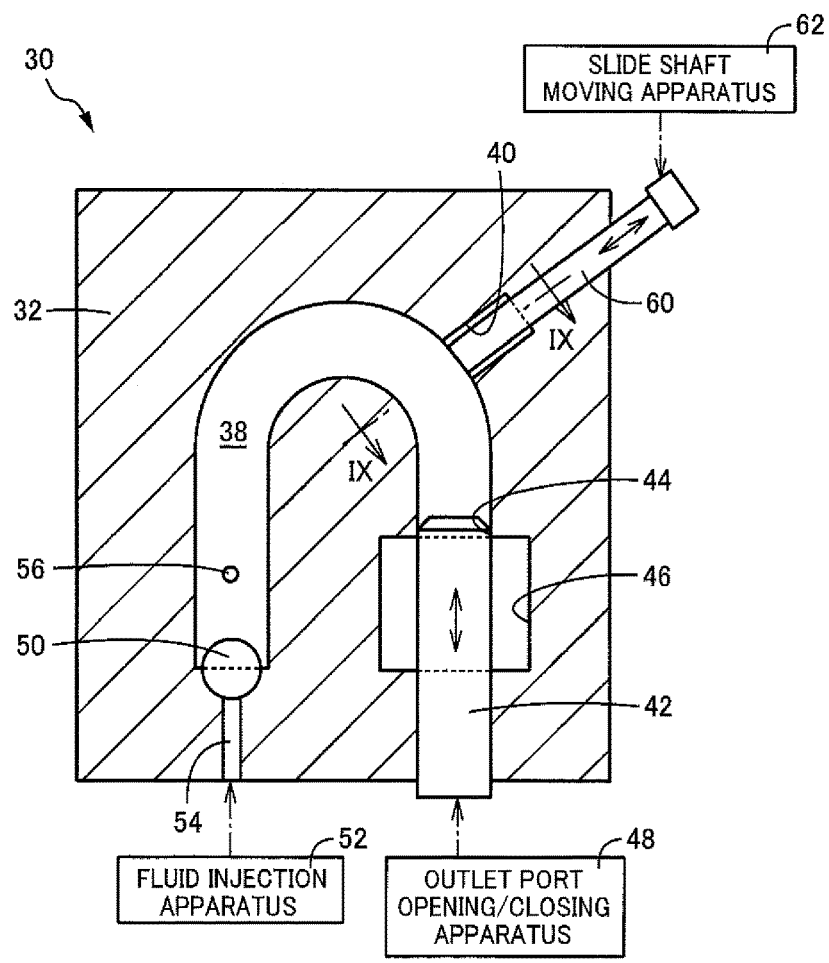
FIG. 2 is a diagram illustrating the general configuration of a manufacturing apparatus that can manufacture the hollow part with a branch in FIG. 1.

FIG. 2 is a diagram illustrating the general configuration of a manufacturing apparatus 30 that can manufacture the hollow part 10 with a branch. The manufacturing apparatus 30 includes a mold 32 that molds the hollow part 10 with a branch. The mold 32 is formed by a pair of divided molds 32a, 32b (see FIGS. 0A to 9D) so that a molded article 34 (see FIG. 8) formed in the mold 32 can be taken out of the mold 32. The mold 32 includes a main cavity 38 having substantially the same outer shape as the main pipe portion 12, and a branch cavity 40 formed so as to communicate with the main cavity 38 and having substantially the same outer shape as the branch pipe portion 14.

Figure 4:
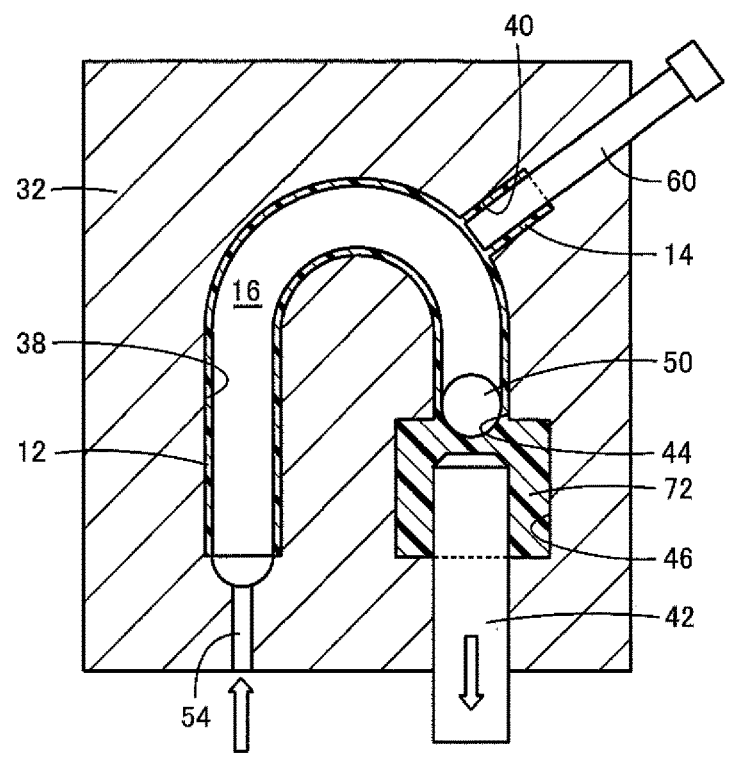
FIG. 4 is a sectional view illustrating a main pipe portion forming step following the resin filling step in FIG. 3.

The main cavity 38 has at its one end an outlet port 44 that is opened and closed by an opening/closing member 42 having a columnar shape, and a waste cavity 46 is formed so as to be continuous with the outlet port 44. The opening/closing member 42 is moved linearly in its axial direction by an outlet port opening/closing apparatus 48, and is stopped at three positions, namely a closed position shown in FIG. 2, a withdrawn position shown in FIG. 7, and an open position shown in FIG. 4, which is an intermediate position between the closed position and the withdrawn position. For example, the outlet port opening/closing apparatus 48 includes a lead screw mechanism that rotates a lead screw by an electric motor to linearly reciprocate the opening/closing member 42 so that the opening/closing member 42 can be stopped and positioned at the three positions. A floating core 50 serving as a hollowing piece is placed at the other end of the main cavity 38. When pressurized fluid (in the present embodiment, inert gas such as nitrogen gas) is injected through a pressurizing port 54 by a fluid injection apparatus 52, the floating core 50 is moved toward the one end in the main cavity 38 by the pressure of the fluid. The floating core 50 has a spherical shape having substantially the same diameter dimension as the main hollow portion 16 of the main pipe portion 12. With the main cavity 38 filled with a resin and the outlet port 44 opened, the floating core 50 is moved to the one end in the main cavity 38 by the pressurized fluid. As shown in FIG. 4, the floating core 50 thus forces excess resin 72 into the waste cavity 46 through the outlet port 44 and forms the main hollow portion 16 in the resin in the main cavity 38, thereby forming the hollow main pipe portion 12. The open position of the opening/closing member 42 is determined as the position where the excess resin 72 can be received by the waste cavity 46. The main cavity 38 has a gate 56 through which a molten resin material is injected.

Figure 3:
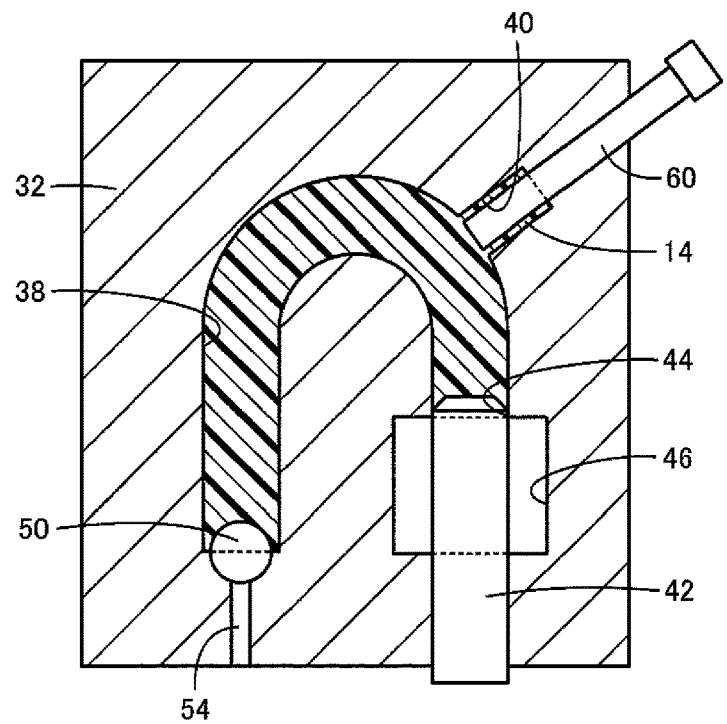
FIG. 3 is a sectional view illustrating a resin filling step in the case of manufacturing the hollow part with a branch shown in FIG. 1 using the manufacturing apparatus of FIG. 2.
Figure 5:
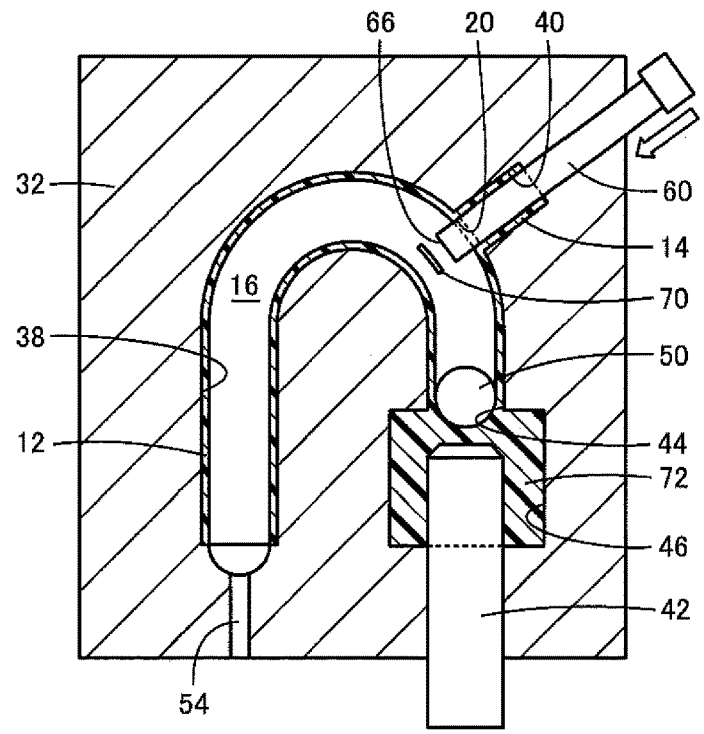
FIG. 5 is a sectional view illustrating a punching step following the main pipe portion forming step in FIG. 4.
Figure 7:
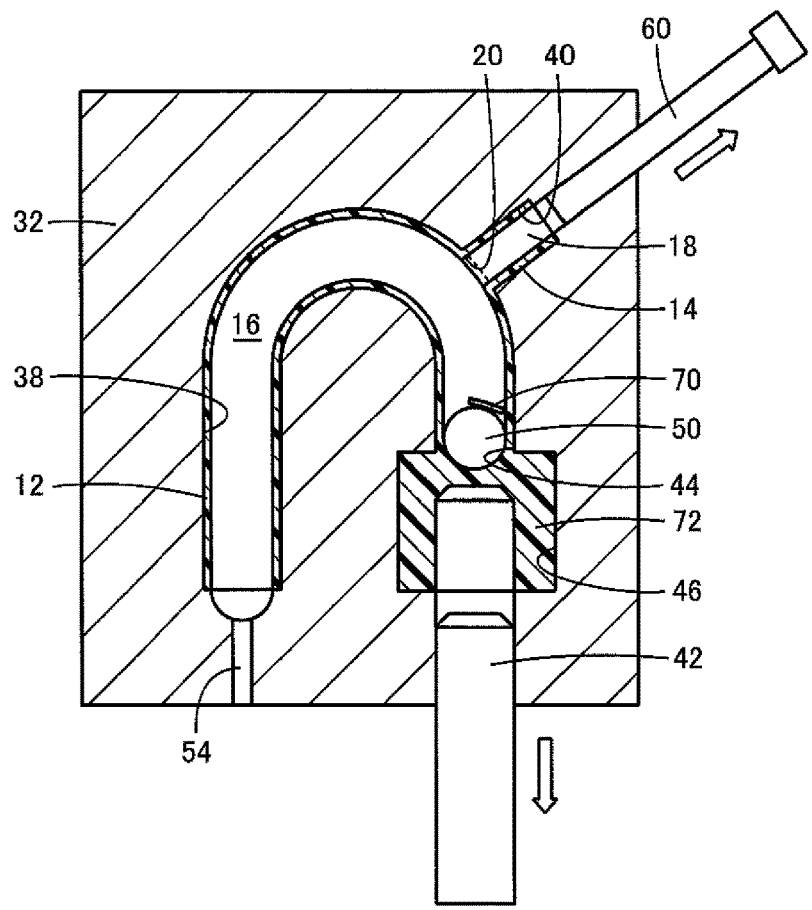
FIG. 7 is a sectional view illustrating a shaft removing step following the punching scrap moving step in FIG. 6.

A slide shaft 60 having a columnar shape with substantially the same diameter dimension as the branch hollow portion 18 of the branch pipe portion 14 is inserted into the branch cavity 40 so that the slide shaft 60 can concentrically advance and withdraw in the branch cavity 40. An annular space between the branch cavity 40 and the slide shaft 60 is filled with a resin to form the branch pipe portion 14 having the branch hollow portion 18. The slide shaft 60 is moved in its axial direction by a slide shaft moving apparatus 62. The slide shaft 60 is stopped at three positions, namely an advanced position where the tip end of the slide shaft 60 projects into the main hollow portion 16 of the main pipe portion 12 as shown in FIG. 5, a withdrawn position where the tip end of the slide shaft 60 is located outside the branch cavity 40 as shown in FIG. 7, and a forming position where the tip end of the slide shaft 60 is located near the main cavity 38 as shown in FIG. 3. For example, the slide shaft moving apparatus 62 includes a lead screw mechanism that rotates a lead screw by an electric motor to linearly reciprocate the slide shaft 60 so that the slide shaft 60 can be stopped and positioned at the three positions. Accordingly, when the slide shaft 60 is advanced to the advanced position as shown in FIG. 5 with the main pipe portion 12 having been formed as shown in FIG. 4, the slide shaft 60 punches through the resin wall in the joint between the main pipe portion 12 and the branch pipe portion 14 and the communication hole 20 is formed.

Figure 10:
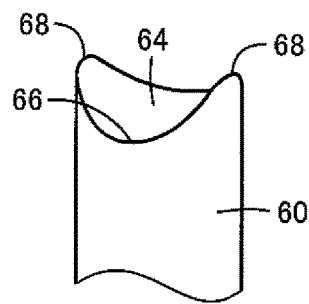
FIG. 10 is a perspective view showing an example of the shape of the tip end of a slide shaft included in the manufacturing apparatus of FIG. 2.

A tip end face 64 of the slide shaft 60 has a concave shape curved inward in the middle as shown in FIG. 10, and an outer peripheral edge 66 of the tip end face 64 functions as a cutting edge. The outer peripheral edge 66 has a plurality of protruding portions 68 (in FIG. 10, two protruding portions 68 located symmetrically with respect to the axis) that are aligned in its circumferential direction with distances each other and that protrude toward the tip end side. The cutting edge of the outer peripheral edge 66 can restrain formation of burrs and can cut the resin wall to form the communication hole 20. The forming position is determined as a position where the protruding portions 68 of the outer peripheral edge 66 project slightly into the main cavity 38 and cut into the resin wall of the main pipe portion 12 so as to make cutting thickness of the resin wall as small as possible. The advanced position is determined as the position where the entire outer peripheral edge 66 of the tip end of the slide shaft 60 projects into the main hollow portion 16 of the main pipe portion 12 so that the outer peripheral edge 66 can cut the resin wall along the entire circumference of the communication hole 20.

Figure 9A:
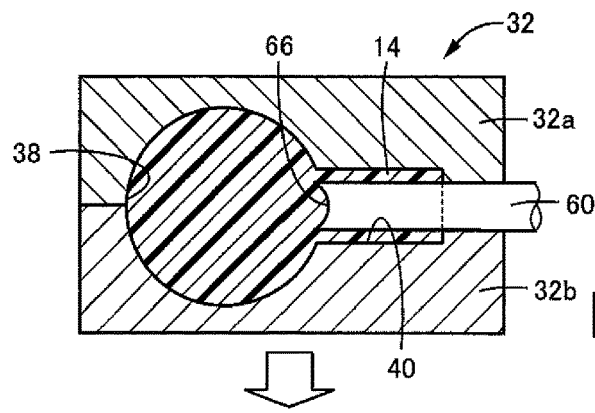
FIGS. 9A to 9D are sectional views of the joint of the branch pipe portion, taken along line IX-IX in FIG. 2, showing the resin filling step, the main pipe portion forming step, the punching step, and the shaft removing step for comparison.

Procedures for manufacturing the hollow part 10 with a branch by using the manufacturing apparatus 30 configured as described above will be described below. First, as shown in FIG. 2, in an initial state where the floating core 50 is placed at the end of the main cavity 38 on the pressurizing port 54 side, the opening/closing member 42 is advanced to the closed position, and the slide shaft 60 is positioned at the forming position, a molten resin material is injected through the gate 56 to fill the main cavity 38 and the branch cavity 40 with the resin as shown in FIG. 3. Since the slide shaft 60 has been inserted in the branch cavity 40, the hollow branch pipe portion 14 is formed in this stage. This step is the resin filling step, and FIG. 3 shows the state after the resin filling step. FIGS. 9A to 9D show sectional views of the joint of the branch pipe portion 14, taken along line IX-IX in FIG. 2. FIG. 9A shows the state after the resin filling step, which corresponds to FIG. 3.

Figure 9B:
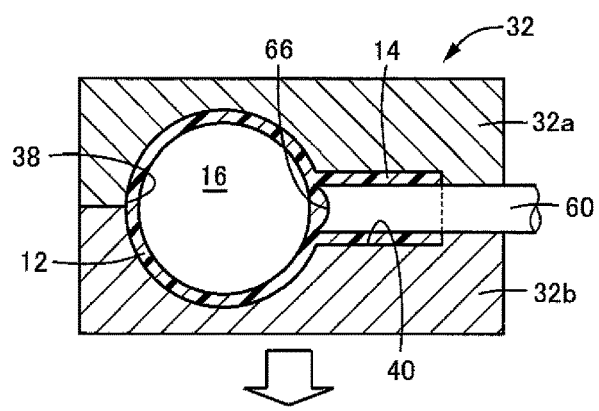

Next, when the outer periphery of the resin in the main cavity 38, namely a surface portion of the resin which is in contact with the mold 32, starts to cool and solidify, the opening/closing member 42 is withdrawn to the open position to open the outlet port 44. In this state, pressurized fluid is injected through the pressurizing port 54 by the fluid injection apparatus 52 to move the floating core 50 to the outlet port 44 as shown in FIG. 4. The excess resin 72 is thus forced through the outlet port 44 into the waste cavity 46, so that the main hollow portion 16 is formed in the resin in the main cavity 38. The hollow main pipe portion 12 is thus formed. This step is the main pipe portion forming step. FIGS. 4 and 9B show the state after the main pipe portion forming step.

Figure 9C:
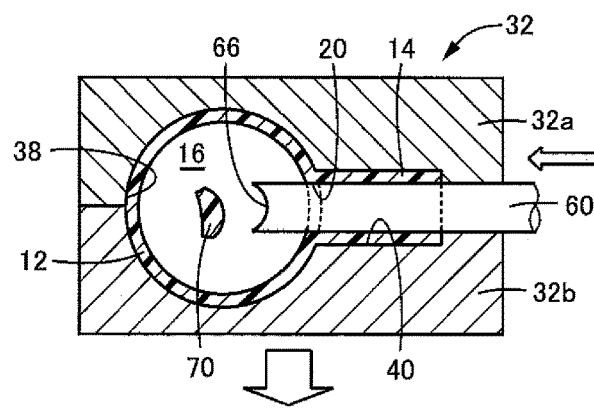

Then, the slide shaft 60 in the branch cavity 40 is advanced to the advanced position so that the entire outer peripheral edge 66 of the tip end of the slide shaft 60 projects into the main hollow portion 16 of the main pipe portion 12. The slide shaft 60 punches through the resin wall of the main pipe portion 12 in the joint of the branch pipe portion 14 to form the communication hole 20. This step is the punching step. FIGS. 5 and 9C show the state after the punching step.

Figure 6:
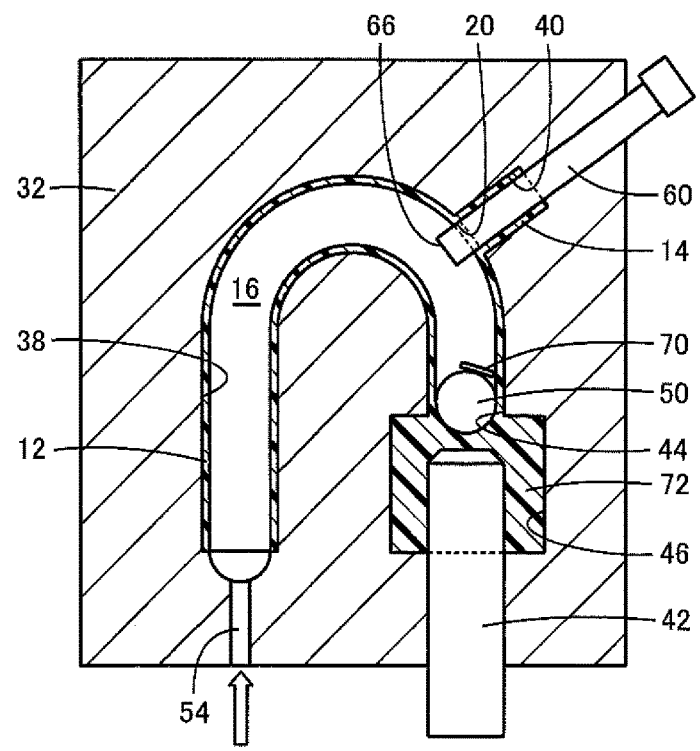
FIG. 6 is a sectional view illustrating a punching scrap moving step following the punching step in FIG. 5.

Subsequently, the pressurized fluid is injected again through the pressurizing port 54 so that punching scrap 70 resulting from formation of the communication hole 20 by the slide shaft 60 in the punching step is forced toward the outlet port 44. This step is the punching scrap moving step. FIG. 6 shows the state after the punching scrap moving step.

Figure 9D:
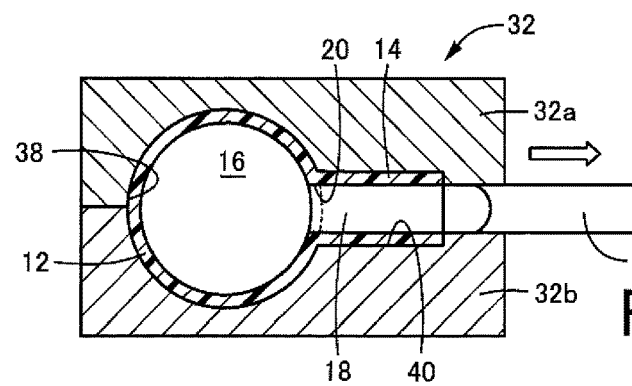

The slide shaft 60 is then moved to the withdrawn position to form the branch hollow portion 18 in the branch pipe portion 14. The opening/closing member 42 is also withdrawn to the withdrawn position so as to be removed from the waste cavity 46. This step is the shaft removing step. FIGS. 7 and 9D show the state after the shaft removing step.

Figure 8:
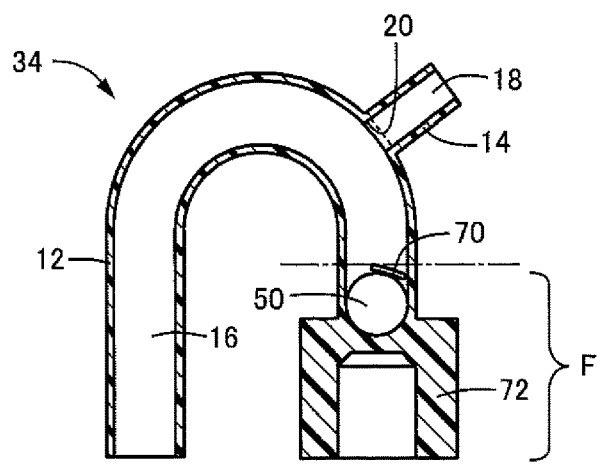
FIG. 8 is a sectional view illustrating a step of taking a molded article out of a mold and cutting off and removing an unwanted portion after the shaft removing step in FIG. 7.

Thereafter, the pair of divided molds 32a, 32b of the mold 32 are opened, the molded article 34 shown in FIG. 8 is taken out of the mold 32, and an unwanted portion F including the excess resin 72 contained in the waste cavity 46 is cut off and removed together with the floating core 50 and the punching scrap 70. The intended hollow part 10 with a branch as shown in FIG. 1 is thus produced. In the present embodiment, the communication hole 20 is formed by punching the resin wall by the slide shaft 60. This restrains formation of burrs and eliminates the need for finishing such as filing depending on conditions. However, finishing such as deburring may be performed as necessary. The excess resin 72 and the punching scrap 70 which have been cut off and removed are recycled. The floating core 50 may be discarded as it is or may be reused after the resin on the floating core 50 is removed. However, the floating core 50 can be recycled together with the excess resin 72 and the punching scrap 70 in the case where the floating core 50 is made of the same synthetic resin material as the hollow part 10 with a branch.

As described above, in the method for manufacturing the hollow part 10 with a branch according to the present embodiment, the slide shaft 60 is advanced toward the main cavity 38 so that the entirety of the outer peripheral edge 66 of the tip end that functions as a cutting edge projects into the main hollow portion 16 of the main pipe portion 12 to form the communication hole 20. Accordingly, the communication hole 20 can be formed in a series of manufacturing steps in a simple and easy way. Moreover, formation of burrs can be restrained, and the need for finishing such as filing is eliminated or reduced. This improves productivity and reduces manufacturing cost.

In particular, the tip end face 64 of the slide shaft 60 has a concave shape curved inward in the middle, and the outer peripheral edge 66 of the tip end face 64 has the plurality of protruding portions 68 that protrude toward the tip end side and that are separated from each other in the circumferential direction. Accordingly, when the outer peripheral edge 66 punches the resin wall to form the communication hole 20, the protruding portions 68 can serve as a starting point for the outer peripheral edge 66 to appropriately cut into and through the resin wall. This further restrains formation of burrs.

Subsequent to the punching step of forming the communication hole 20, pressurized fluid (inert gas) is injected through the pressurizing port 54 so that the punching scrap 70 resulting from formation of the communication hole 20 is forced toward the outlet port 44. Accordingly, the excess resin 72 together with the punching scrap 70 can be collected and recycled, which facilitates post-processing of the punching scrap 70.

Figure 11:
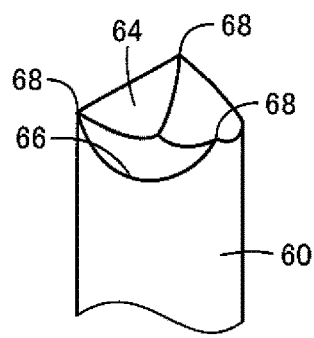
FIG. 11 is a perspective view showing another example of the shape of the tip end of the slide shaft.
Figure 12:
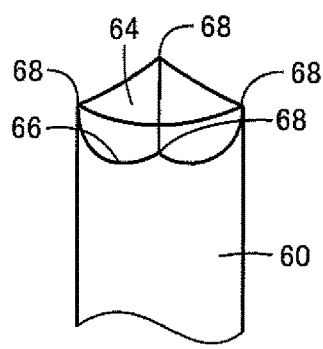
FIG. 12 is a perspective view showing still another example of the shape of the tip end of the slide shaft.

The outer peripheral edge 66 of the tip end of the slide shaft 60 of the above embodiment has the two protruding portions 68 arranged symmetrically with respect to the axis. However, the outer peripheral edge 66 of the tip end of the slide shaft 60 may have three protruding portions 68 at regular angular intervals as shown in FIG. 11, or may have four protruding portions 68 at regular angular intervals as shown in FIG. 12.

Figure 13:
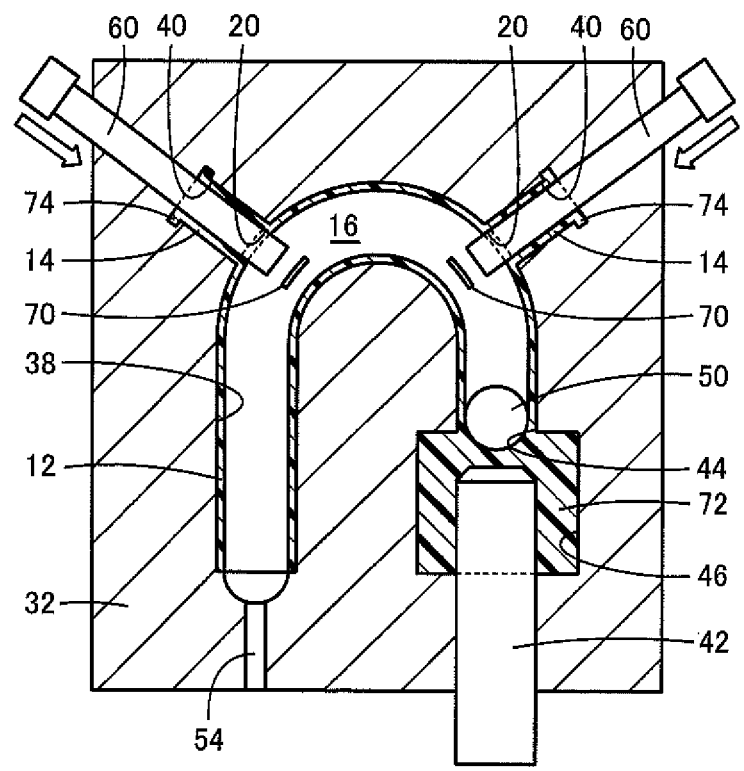
FIG. 13 is a sectional view illustrating the manufacturing apparatus to which another embodiment of the present invention is applied and corresponding to the punching step of FIG. 5.

In the above embodiment, the main pipe portion 12 is provided with the single branch pipe portion 14. However, as shown in FIG. 13, the main pipe portion 12 may be provided with a plurality of (in FIG. 13, a pair of) branch pipe portions 14. For example, the branch pipe portions 14 are connected to the main pipe portion 12 substantially at right angles as shown in the figure. However, the branch pipe portions 14 may be connected to the main pipe portion 12 in an attitude tilted with respect to the direction perpendicular to the main pipe portion 12. In the embodiment of FIG. 13, annular flanges 74 are formed integrally with the branch pipe portions 14 so as to extend from the tip end of the branch pipe portion 14 to the outer peripheral side. In this case, the branch pipe portions 14 can be reliably prevented from being drawn toward the main pipe portion 12 when the slide shaft 60 is advanced to form the communication hole 20. FIG. 13 is a sectional view corresponding to the punching step of FIG. 5.

The embodiments of the present invention are described in detail above based on the drawings. However, these embodiments are given by way of example only, and the present invention can be embodied in various modified or improved forms based on the knowledge of those skilled in the art.

REFERENCE SIGNS LIST

10: Hollow part with a branch 12: Main pipe portion 14: Branch pipe portion 16: Main hollow portion 18: Branch hollow portion 20: Communication hole 30: Manufacturing apparatus 32: Mold 38: Main cavity 40: Branch cavity 44: Outlet port 50: Floating core (Hollowing piece) 52: Fluid injection apparatus 54: Pressurizing port 60: Slide shaft 62: Slide shaft moving apparatus 64: Tip end face 66: Outer peripheral edge 68: Protruding portion 70: Punching scrap 72: Excess resin

The invention claimed is:

1. An apparatus for manufacturing a hollow part with a branch, the apparatus including:
    a mold having a main cavity in which a hollowing piece is, placed and a branch cavity (i) that is formed so as to communicate with the main cavity, (ii) in which a slide shaft is inserted so as to advance and withdraw, and (iii) that forms a branch pipe portion in an annular space between the branch cavity and the slide shaft,
    a fluid injection apparatus that injects pressurized fluid into the main cavity through a pressurizing port formed at a first end of the main cavity that is an opposite end of the main cavity from an outlet port formed at a second end of the main cavity, in order to form a hollow main pipe portion by moving the hollowing piece to force excess resin out of the main cavity through the outlet port and thus form a main hollow portion in the resin in the main cavity, and
    a slide shaft moving apparatus that withdraws the slide shaft located in the branch cavity to form a branch hollow portion in the branch pipe portion, the slide shaft moving apparatus including a lead screw mechanism including a lead screw and an electric motor that is configured to rotate the lead screw to linearly reciprocate the slide shaft,
    the hollow part with the branch being made of a resin and having the branch pipe portion integrally connected to the main pipe portion such that the main hollow portion and the branch hollow portion communicate with each other,
    the slide shaft moving apparatus being configured to advance and withdraw the slide shaft so that a communication hole is formed through a portion of a resin wall of the main pipe portion, at which the branch pipe portion is connected, by advancing the slide shaft toward the main cavity so that an entire outer peripheral edge of a tip end of the slide shaft projects into the main hollow portion of the main pipe portion, and
    a tip end face of the slide shaft having a concave shape curved inward in a middle, and an outer peripheral edge of the tip end face having a plurality of protruding portions that protrude toward a tip end side and that are separated from each other in a circumferential direction,
    wherein the apparatus is configured to manufacture the hollow part with the branch by performing an injection molding in the mold.

2. The apparatus according to claim 1, wherein the slide shaft moving apparatus is configured to stop the slide shaft at a position where the slide shaft does not prevent the hollowing piece from moving in the main cavity while the hollowing piece is moved in the main cavity by the fluid injection apparatus.

3. The apparatus according to claim 1, further including an outlet port opening/closing apparatus that opens and closes the outlet port by linearly moving an opening/closing member having a columnar shape in a direction of an axis of the opening/closing member.

4. A method for manufacturing a hollow part with a branch by using the apparatus of claim 1, the method including:
    a resin filling step of filling the mold with a molten resin;
    a main pipe portion forming step of forming the hollow main pipe portion by moving the hollowing piece to force the excess resin out of the main cavity through the outlet port and thus form the main hollow portion in the resin in the main cavity;
    a shaft removing step of withdrawing the slide shaft located in the branch cavity to form the branch hollow portion in the branch pipe portion;
    a punching step of, after forming the main pipe portion in the main pipe portion forming step, advancing the slide shaft toward the main cavity so that the entire outer peripheral edge of the tip end of the slide shaft projects into the main hollow portion of the main pipe portion and thus forms the communication hole through the portion of the resin wall of the main pipe portion at which the branch pipe portion is connected; and
    a punching scrap moving step of, subsequent to the punching step, injecting the pressurized fluid through the pressurizing port to move punching scrap resulting from formation of the communication hole by the slide shaft toward the outlet port,
    the hollow part with the branch being made of the resin and having the branch pipe portion integrally connected to the main pipe portion such that the main hollow portion and the branch hollow portion communicate with each other, and
    in the main pipe portion forming step, the hollowing piece being moved to the outlet port by injecting the pressurized fluid into the main cavity though the pressurizing port.

* * * * *